United States Patent

[11] 3,615,762

[72] Inventors Richard John Parry
 Southport;
 Reginald Dunning, Parbold; Albert Forber, Upholland; George Albert Higham, Wigan, all of England
[21] Appl. No. 740,462
[22] Filed June 27, 1968
[45] Patented Oct. 26, 1971
[73] Assignee Pilkington Brothers Limited
 Liverpool, England
[32] Priority July 26, 1967
[33] Great Britain
[31] 34419/67

[54] THORIUM-FREE, LANTHANUM BORATE OPTICAL GLASS
 3 Claims, No Drawings
[52] U.S. Cl. .................................................. 106/47 Q, 106/54
[51] Int. Cl. .................................................. C03c 3/00
[50] Field of Search .................................... 106/47, 54, 47 Q, 47 R

[56] References Cited
 UNITED STATES PATENTS
| | | | |
|---|---|---|---|
| 2,861,000 | 11/1958 | Geffcken et al. | 106/47 |
| 3,074,805 | 1/1963 | Geffcken et al. | 106/47 |
| 3,081,178 | 3/1963 | Weissenberg et al. | 106/47 |

FOREIGN PATENTS
| | | | |
|---|---|---|---|
| 137,625 | 1/1950 | Australia | 106/47 |
| 1,066,068 | 1/1954 | France | 106/47 |
| 1,061,976 | 7/1959 | Germany | 106/54 |

Primary Examiner—Tobias E. Levow
Assistant Examiner—W. R. Satterfield
Attorney—Morrison, Kennedy and Campbell ABSTRACT: Thorium-free optical glass having increased resistance to acids and improved devitrification characteristics, and containing by weight as essential ingredients from 37 to 45% $B_2O_3$, from 45 to 53% $La_2O_3$, and from 0.5 to 4.5% $Al_2O_3$.

THORIUM-FREE, LANTHANUM BORATE OPTICAL GLASS

BACKGROUND OF THE INVENTION

The present invention relates to thorium-free optical glass.

SUMMARY

According to the present invention, there is provided a thorium-free optical glass containing by weight, as essential ingredients, from 37 to 45% of $B_2O_3$, from 45 to 53% of $La_2O_3$, and from 0.5 to 4.5% of $Al_2O_3$, and, as optional ingredients, up to 6% of $SiO_2$, up to 3% of CaO, and up to 10% of SrO.

Preferably, the proportion by weight of $B_2O_3$ is between 38 and 43%. The glass preferably contains fluorine in a proportion by weight of up to 1.5%. The glass also preferably contains $SiO_2$ in a proportion by weight of at least 2.0%.

The optical glasses of the present invention have increased resistance to acids, and improved devitrification characteristics, as compared with known optical glasses of similar optical properties but which contain thorium.

The thorium-free optical glasses of the present invention may have a refractive index ($n_e$) between 1.69 and 1.71, and a relative dispersion ($V_e$) between 55.25 and 56.5. However most of these glasses have $n_e$ values between 1.691 and 1.705, and $V_e$ values between 55.45 and 56.3.

DESCRIPTION OF THE PREFERRED EMBODIMENTS

Some examples of glass compositions according to the invention are given in the table below.

TABLE I

| No. of melt | Percentage by weight of oxides | | | | | | |
|---|---|---|---|---|---|---|---|
| | $B_2O_3$ | $La_2O_3$ | $SiO_2$ | $Al_2O_3$ as $Al(OH)_3$ | $Al_2O_3$ as $AlF_3$ | CaO | SrO |
| 1 | 42.32 | 48.09 | | 2.66 | | 2.43 | 4.50 |
| 2 | 38.73 | 47.79 | 2.05 | 4.35 | | | 7.08 |
| 3 | 42.89 | 47.39 | | 1.74 | | | 7.98 |
| 4 | 41.55 | 52.66 | 2.00 | 3.80 | | | |
| 5 | 41.70 | 52.83 | 2.50 | 2.97 | | | |
| 6 | 41.70 | 51.83 | 2.50 | | 2.97 | | 1.00 |
| 7 | 41.71 | 50.84 | 2.50 | | 2.97 | | 1.98 |
| 8 | 41.70 | 51.83 | 2.50 | 2.97 | | | 1.00 |
| 9 | 41.71 | 50.84 | 2.50 | 2.97 | | | 1.98 |
| 10 | 41.71 | 50.84 | 2.50 | 1.97 | 1.00 | | 1.98 |
| 11 | 41.71 | 50.84 | 2.50 | 0.97 | 2.00 | | 1.98 |
| 12 | 41.71 | 50.84 | 2.50 | | 2.97 | | 1.98 |
| 13 | 42.09 | 51.31 | 2.52 | | 3.00 | 1.08 | |
| 14 | 41.71 | 50.84 | 2.50 | | 2.97 | | 1.98 |
| 15 | 40.10 | 48.12 | 4.8 | 0.75 | | 2.16 | 3.98 |
| 16 | 40.10 | 46.92 | 6.00 | 0.75 | | 2.16 | 3.98 |

Samples of these melts were subjected to normal annealing by holding the glass in the annealing furnace at the annealing temperature for about 1 hour, and then switching off the furnace and allowing this and the glass to cool naturally. It was found that the glasses of melts 1 to 14 so produced all had a refractive index ($n_e$) value between 1.69 and 55.83. Glasses of melts 15 and 16 had slightly lower $n_e$ values and slightly higher $V_e$ values. For example, melt 16 has a $n_e$ value of 1.69143 and a $V_e$ value of 56.26.

Samples of these same melts were also subjected to fine annealing by cooling at the rate of 20° C. per day from the annealing temperature, and higher values of $n_e$ up to 1,709, and of $V_e$ up to 56.5 were obtained with glasses fine annealed in this way. For example, melt 15, when fine annealed in this way has a $n_e$ value of 1.69823 and a $V_e$ value of 56.2.

It has been found that the inclusion of up to 1.5 percent fluorine, e.g. by the use of $AlF_3$ to provide some or all of the $Al_2O_3$, assists in melting any glass which contains silicon and also tends to give higher $n_e$ and $V_e$ values than the fluorine-free glass of otherwise similar composition.

The effect of fluorine was checked in the case of melts Nos. 9 to 12. As will be apparent from table I, all these melts contain identical amounts of $B_2O_3$, $La_2O_3$, $SiO_2$, $Al_2O_3$ and SrO, and only differ in the increasing proportions of fluorine introduced as $AlF_3$. Thus while in melt No. 9 all the $Al_2O_3$ is provided for by $Al(OH)_3$, in melts Nos. 10 and 11 the $Al_2O_3$ is partially provided for by $AlF_3$, and in melt No. 12 all the $Al_2O_3$ is provided as $AlF_3$.

Samples of glass from melts 9 to 12 annealed in identical conditions, and the $n_e$ and $V_e$ values were then carefully checked, giving the following results:

TABLE II

| No. of Melts | $n_e$ | $V_e$ |
|---|---|---|
| 9 | 1.69895 | 55.74 |
| 10 | 1.69914 | 55.77 |
| 11 | 1.70038 | 55.80 |
| 12 | 1.70095 | 55.82 |

These results show that as the fluorine content of the melt is increased, values of $n_e$ and $V_e$ also increase.

The fluorine can alternatively be added in the form of lanthanum fluoride or strontium fluoride.

We claim:

1. A thorium-free optical glass which has a refractive index ($n_e$) between 1.69 and 1.71 and a relative dispersion ($V_e$) between 55.25 and 56.5 consisting essentially of, in percentages by weight.

| | |
|---|---|
| $B_2O_3$ | from 38.73% to 42.89%, |
| $La_2O_3$ | from 46.92% to 52.83%, |
| $Al_2O_3$ | from 0.75% to 4.35%, | and at least one oxide of the group consisting of 2 to 6% $SiO_2$, 1.08 to 2.43% CaO, and 1 to 7.98% SrO.

2. An optical glass according to claim 1, including fluorine in a proportion by weight of up to 1.5 percent.

3. An optical glass according to claim 1, having a refractive index ($n_e$) between 1.691 and 1.705, and having a relative dispersion ($V_e$) between 55.45 and 56.3.

UNITED STATES PATENT OFFICE
CERTIFICATE OF CORRECTION

Patent No. 3,615,762        Dated October 26, 1971

Inventor(s) Richard J. Parry et al

It is certified that error appears in the above-identified patent and that said Letters Patent are hereby corrected as shown below:

IN THE SPECIFICATION

Column 1, Line 54    Insert after 1.69 -- and 1.705 and a relative dispersion ($V_e$) value between 55.45--

Column 2, Line 22    Insert after 12 -- were fine--

Signed and sealed this 6th day of June 1972.

(SEAL)
Attest:

EDWARD M. FLETCHER, JR.            ROBERT GOTTSCHALK
Attesting Officer                  Commissioner of Patents